United States Patent
Havis et al.

[11] Patent Number: 6,135,407
[45] Date of Patent: Oct. 24, 2000

[54] NOSE SHAPED EYEGLASS HOLDER

[76] Inventors: John L. Havis; Tiffany D. Havis, both of 386 Linden, Glen Ellen, Ill. 60137; Ronald J. Scheidelman, 4914 Columbia Ave., Lisle, Ill. 60532

[21] Appl. No.: 09/102,264

[22] Filed: Jun. 22, 1998

[51] Int. Cl.[7] ................... A47F 5/00; A47F 7/02
[52] U.S. Cl. ........................ 248/309.1; 248/902
[58] Field of Search .................. 248/902, 309.1; 211/85.1; D3/266; D9/314

[56] References Cited

U.S. PATENT DOCUMENTS

| | | |
|---|---|---|
| D. 185,746 | 7/1959 | Glover . |
| D. 206,097 | 10/1966 | Neiswanger ............... D3/266 |
| D. 262,361 | 12/1981 | Rohr .................... 248/902 X |
| D. 305,340 | 1/1990 | Stein . |
| D. 358,707 | 5/1995 | Holt . |
| D. 372,122 | 7/1996 | Rothenberg ............. D3/266 |
| D. 379,871 | 6/1997 | Hollinger . |
| D. 393,557 | 4/1998 | Guccione ............. D3/266 X |
| 993,404 | 5/1911 | Price .................. 248/902 X |
| 2,467,251 | 4/1949 | Bowman . |
| 2,468,437 | 4/1949 | Foley ................. 248/902 X |
| 2,949,683 | 8/1960 | Glover ................ 248/902 X |
| 2,958,495 | 11/1960 | Foster . |
| 3,259,358 | 7/1966 | Dann . |
| 3,291,429 | 12/1966 | Neanhouse . |
| 4,867,402 | 9/1989 | Benson . |
| 4,941,634 | 7/1990 | Gomes . |
| 5,000,410 | 3/1991 | Beavers . |
| 5,069,416 | 12/1991 | Ennis ................. 211/85.1 X |
| 5,100,006 | 3/1992 | Forrester ............ 248/902 X |
| 5,137,242 | 8/1992 | Reath ................ 248/902 X |
| 5,178,283 | 1/1993 | Ennis . |
| 5,316,252 | 5/1994 | Charnow et al. ...... 248/902 X |
| 5,372,345 | 12/1994 | Schmidt . |
| 5,554,067 | 9/1996 | Lecerf . |
| 5,592,244 | 1/1997 | Vymeister . |

*Primary Examiner*—Anita M. King

[57] ABSTRACT

An eyeglass holder adapted to be mounted on vertical surfaces such as automobile dashboards. Having a nose-shaped piece, the nose-shaped piece having a rearwardly sloped bridge, which engages and supports an eyeglass bridge, a nostril-shaped lower portion and a back. It also has an eyeglass temple-supporting horizontally positioned mount, attached to the back of the nostril-shapes lower portion. Fasteners are associated with the mount for attaching to a substantially vertical surface. The eyeglass holder may be either solid or hollow in construction. The mount of the eyeglass holder may be rectangular. Then the mount has a front, top and back, the back having a width greater than the width of the nose-shaped piece. The sloped bridge may either be saddle-shaped, cut off to a blunt end or both. The nose-shaped piece may be cut off. Additionally, the eyeglass holder acts as a shock absorber against turbulent motion and accidental striking.

12 Claims, 4 Drawing Sheets

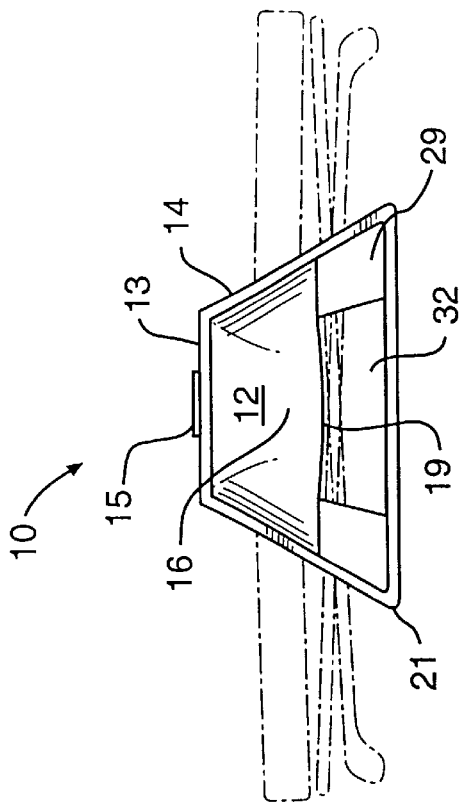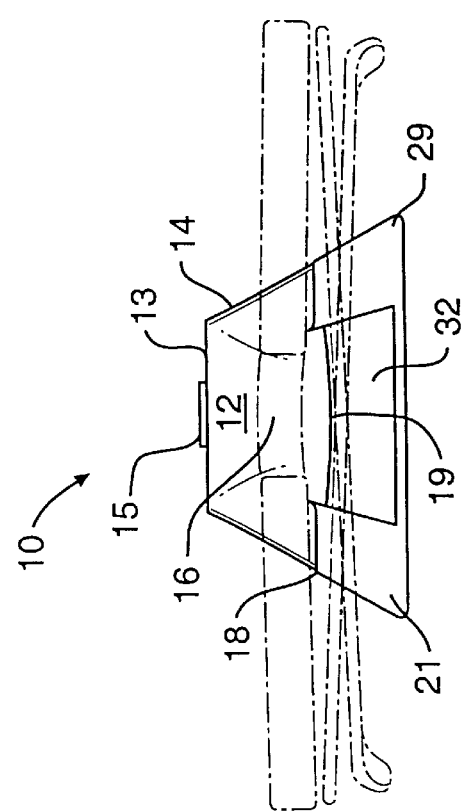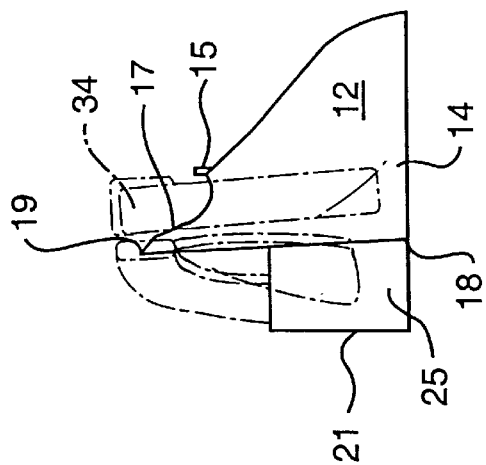

NOSE SHAPED EYEGLASS HOLDER

FIELD OF THE INVENTION

The Invention relates to an eyeglass holder for mounting onto vertical surfaces.

BACKGROUND OF THE INVENTION

Eyeglasses, particularly reading glasses and sunglasses, are often lost, damaged or destroyed after their owners position them on surfaces or in places inappropriate for these delicate optical devices. Either they are misplaced or necessitate time and travel to retrieve them. For sunglasses, commonly left on a car seat, one may inadvertently sit on or otherwise accidentally damage or destroy them. For eyeglasses used while driving, if they are not at hand; it is hazardous to visually search about the vehicle for them while it is in motion.

Addressing these problems, prior art describes a variety of eyeglass holders, including stand-alone and eyeglass holders fixed to a solid surface. For the most part these devices are relatively complex and expensive to make. Further, these prior art devices may be incapable of holding a wide range of eyeglasses such as half-glasses and over sized glasses, such as certain sunglasses.

The invention described herein is manifestly simple. It safely and swiftly stores eyeglasses while offering deftly quick, as well as safe, convenient storage and retrieval of them. The eyeglass holder is easily and quickly installed and removed. Finally, it is inexpensive to make.

SUMMARY OF THE INVENTION

The invention relates to an eyeglass holder adapted to be mounted on vertical surfaces such as automobile dashboards. It comprises a nose-shaped piece having a rearwardly sloped nose-shaped bridge for engaging and supporting an eyeglass nosepiece, a nostril-shaped lower portion and a back. Associated with the nose-shaped piece is an eyeglass temple-supporting, horizontally positioned mount, having a front, top, sides, width and back. The back of the nose-shaped piece has an apex.

In the preferred embodiment, the mount is shown having a block shape, which is rectangular with two ends or arms. The top of the mount supports the temples of the eyeglasses placed on the holder. The back of the nostril-shaped lower portion, is centered in the front of the mount.

In another embodiment, the sides of the mount conform to the configuration of the back edge of the nostril-shaped lower portion of the nose-shaped piece. The eyeglass holder of the invention, described above, may be either solid or hollow. In a further embodiment, the nostril-shaped portion terminates in a cut off on a substantially vertical plane to produce a cut off nostril-shaped portion. At the terminus, the cut off may be partially or fully open, or closed. The lower front portion of the bridge contains a horizontal stop to urge against the nosepiece of the eyeglasses. In another embodiment, the upper portion of the ridge is saddle-shaped, where the nosepiece reposes. In this embodiment, the nose-shaped piece may or may not be cut off.

The rearwardly sloping back or back edge of the nose-shaped piece secures the eyeglasses once in place, in cooperation with the opposing vertical wall to which the eyeglass holder is attached. Once positioned, the temples urge against the vertical wall and the back of the nose-shaped piece to constrain the eyeglasses for safe and secure storage. The invention permits facile storing and removal of the eyeglasses using only one hand.

Fasteners are associated with the mount of the invention. The holder is mounted to a substantially vertical surface preferably using adhesives that are in the form of a double sided tape affixed to the back of the rectangular mount. Alternately, mounting through orifices extending through the ends or arms of the rectangular mount may be incorporated into the eyeglass holder of the invention to allow mounting with mechanical fasteners such as screws or brads. Alternate fasteners include magnets and Velcro.

BRIEF DESCRIPTION OF THE DRAWINGS

FIG. 5 is a top view of the eyeglass holder of the invention, the lower portion of its nose-shape terminates in a cut off, with a pair of eyeglasses position on the sloped bridge.

FIG. 6. is a bottom view of the eyeglass holder of the invention, the lower portion of its nose-shape terminates in a cut off, with a pair of eyeglasses position on the sloped bridge.

FIG. 8. Is a side view of FIG. 7.

In the drawings, like parts have like numbers.

DETAILED DESCRIPTION OF THE INVENTION

Figure 1:
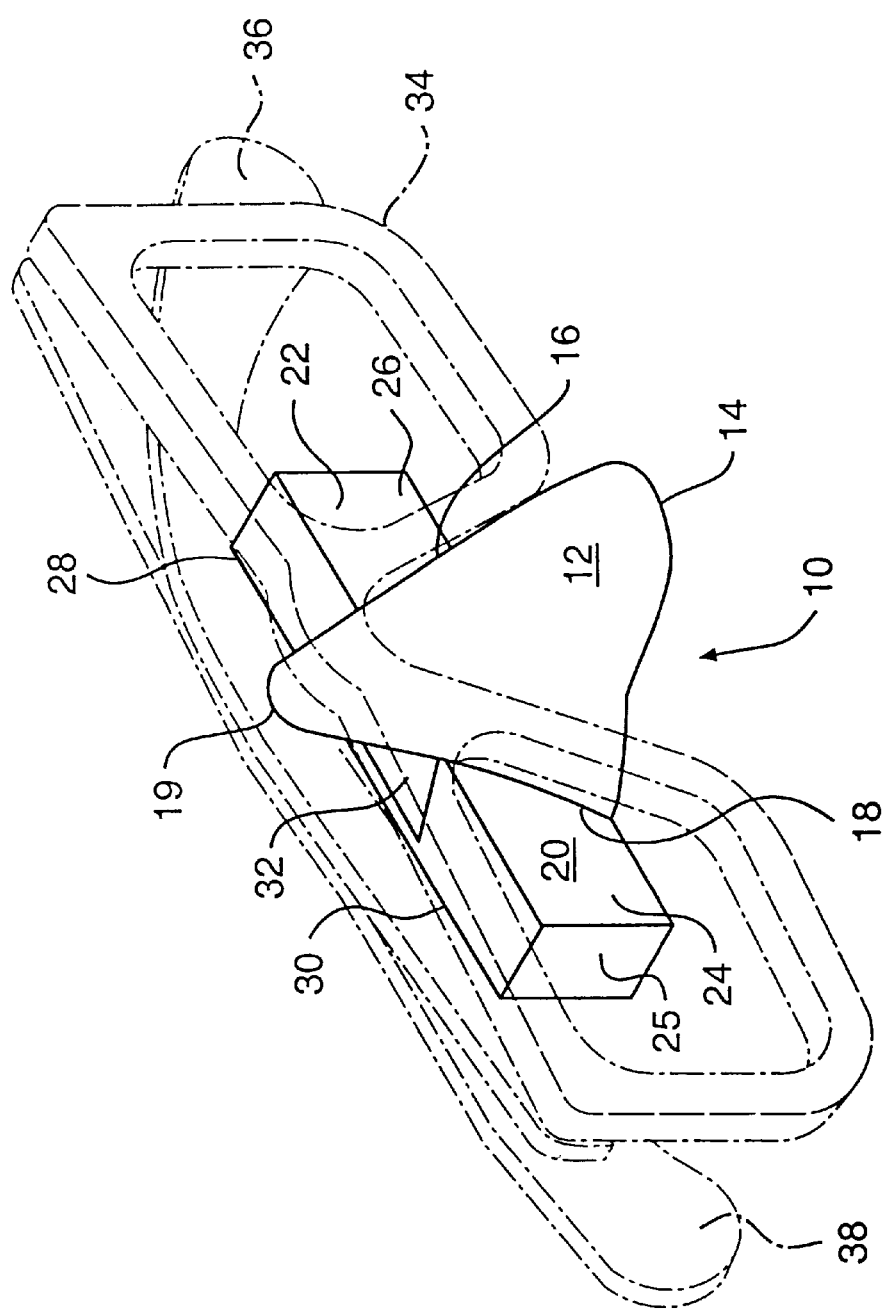
FIG. 1 is a perspective view of the nose-shaped eyeglass holder of the invention having a rectangular mount, with a pair of eyeglasses positioned on the sloped bridge.
Figure 2:
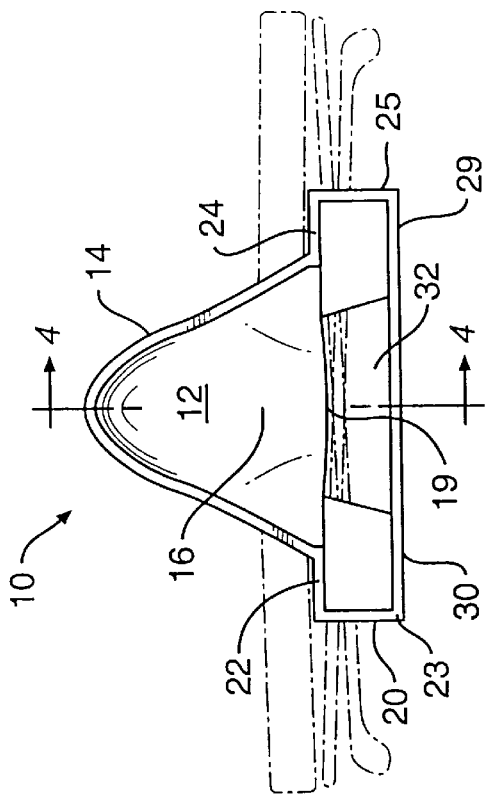
FIG. 2 is a top view of the eyeglass holder of the invention, having a rectangular mount, with a pair of eyeglasses positioned on the sloped bridge.
Figure 3:
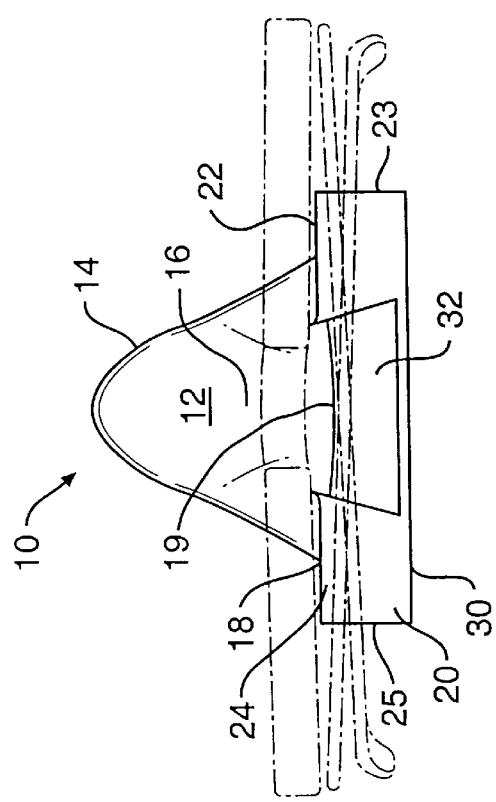
FIG. 3 is a bottom view of the eyeglass holder of the invention having a rectangular mount, with a pair of eyeglasses positioned on the sloped bridge.
Figure 4:
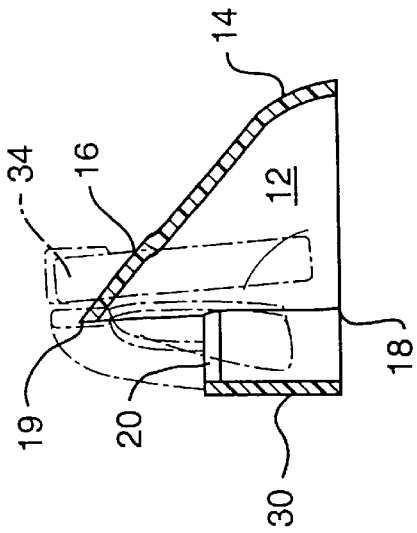
FIG. 4 is a cross-section view of the eyeglass holder of the invention, having a rectangular mount taken along the lines 4—4 of FIG. 3.
Figure 7:
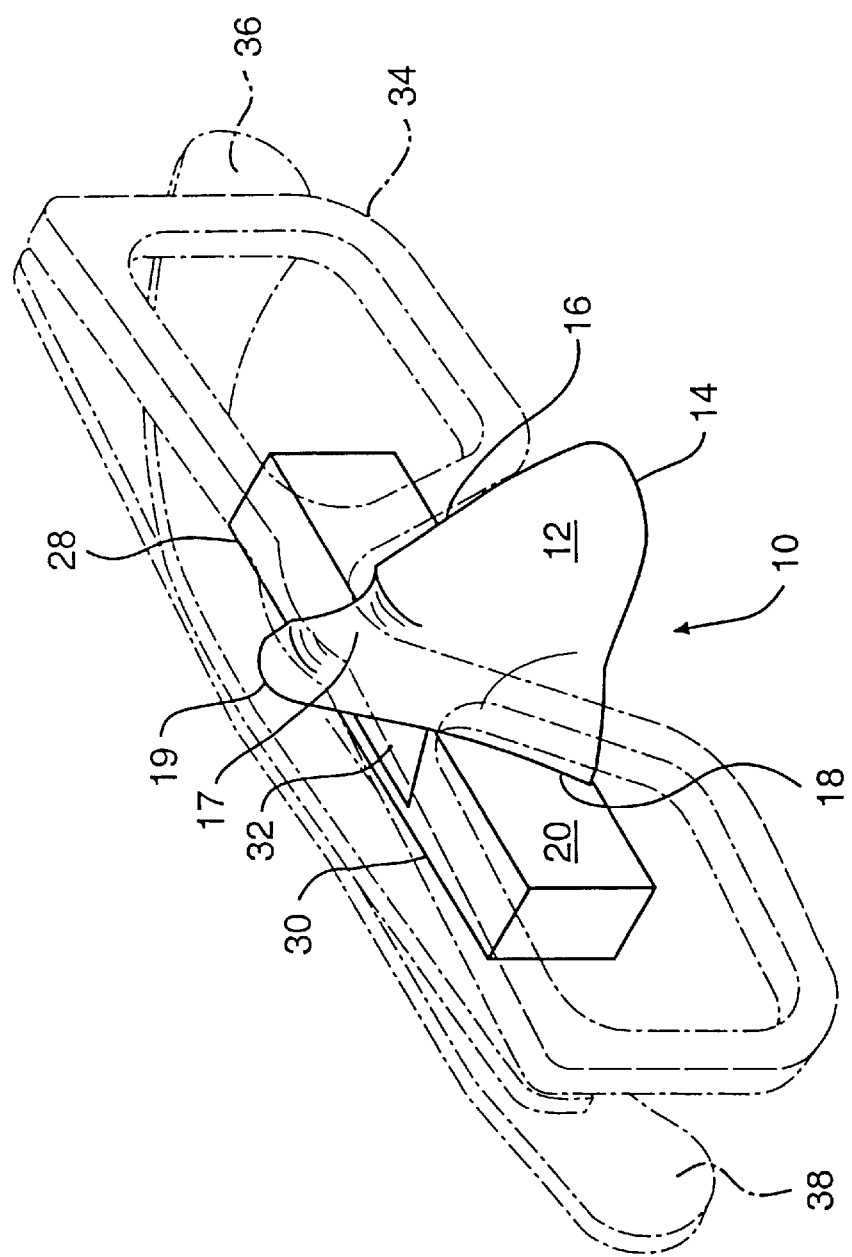
FIG. 7. Is a perspective view of the eyeglass holder of the invention wherein the upper portion of the bridge is saddle-shaped, the mount is rectangular, with a pair of eyeglasses positioned on the sloped bridge.

The numeral 10 always designates the eyeglass holder of the invention. FIG. 1–4 show the preferred embodiment of the eyeglass holder of the invention 10. It is of one-piece construction. Separately and not shown is/are the fastener(s) used to affix the invention to a substantially vertical surface. A nose-shaped piece 12 which has a nostril-shaped lower portion 14 and a rearwardly sloped nose-shaped bridge 16, i.e., a line tracing the nose-shaped bridge from its base upwards runs rearward toward the back of the eyeglass holder. Back 18 of nose-shaped piece has an apex 19. The nose-shaped piece 12 is attached in the area of the nostril-shaped lower portion 14 and is centered upon the front 26 of a horizontal rectangular mount 20.

This rectangular mount 20 is of such a width that it extends horizontally beyond the width of the nose-shaped piece 12. This provides a pair of arms 22 and 24, extending from the right and left side of the nosepiece respectively, which terminates in sides 23 and 25 for the right and left arms respectively. The width of the mount is defined as the distance between the sides, 23 and 25. The width of the nose-shaped piece is defined as the distance spanned by the nostril-shaped lower portion of the nose 16 as measured along the base of the front of the mount 26. Rectangular mount 20 has a front 26, a top 28 and a back 30. As shown in the drawings, the back 18 of the nose-shaped bridge extends nearly vertically above top 28 of rectangular mount 20.

Additionally, nose-shaped bridge 16 angles rearward toward the back 30 of rectangular mount 20. The deviation of the back 18 from vertical, when the eyeglass holder is installed on a vertical surface, may range between five and twenty degrees. Seven degrees is preferred. To impart this angle to the back 18 of nose-shaped bridge, the top 28 of the rectangular mount 20, at the point where it is affixed to the nose-shaped piece, contains a trapezoidal-shaped opening 32 whose base is located toward the back 30 of rectangular mount 20. In a preferred embodiment of the invention, the eyeglass holder 10 is hollow. When the mount 20 is hollow, its front 26 may be partially or fully open. The sides 23 and 25 may be horizontally attached to or formed as part of the back of the nostril-shaped lower portion 18. Further, when the mount is hollow, its bottom 29 is open.

OTHER EMBODIMENTS

FIG. 5–8 show non-preferred embodiments of the eyeglass holder of the invention. All embodiments shown are hollow. Back 18 of nose-shaped piece 12 is centered in the area of the nostril-shaped lower portion upon the front 26 of the trapezoidal-shaped mount 21. This mount is of such a length that it extends horizontally to the entire width of the lower portion of the nose-shaped piece 14. FIG. 5 and FIG. 6 shows it terminating in a cut off 13, of the nose-shaped piece 12. Substantially parallel to the back of the mount 30, is a horizontally positioned vertical stop 15 at the top portion of cut off 13 at the nose-shaped bridge 16. The cut off as shown in FIG. 6 is closed. It may also be open. FIG. 8 shows a saddle-shaped configuration 17, of the upper portion of the bridge 16, where the nosepiece of the eyeglasses reposes (not shown). The back 18 of nose-shaped piece 12 is attached in the area of the nostril-shaped lower portion 14. In a desired embodiment, sides 23 and 25 are horizontal projections on the back of the nostril-shaped lower portion 18.

In non-preferred embodiments, the eyeglass holder may be solid. Materials of construction are the thermoplastic resins such as polypropylene, acryonitrile-butadiene-styrene polymers (ABS), polystyrene or the like. Metal or wood may also be used. Polypropylene is the preferred material. Known fabrication techniques such as injection molding is preferred. Die casting, vacuum forming or the like may also be used.

The eyeglass holder 10 is easily mounted to vertical surfaces by adhesives. The adhesive is preferably in the form of a double-sided tape mounted on back 30 of rectangular mount 20. The adhesive may be supplied already attached to the eyeglass holder as a patch or applied separately. Then it can be supplied in a small container. The holder may be mounted using screws or brads, which pass through orifices (not shown), in arms 22 and 24. Such orifices would respectively communicate from the front 26 of rectangular mount 20 through the back 30 of the rectangular mount 20, thereby affixing the back 30 of the rectangular mount 20 to the substantially vertical surface (not shown).

The eyeglass holder of the invention once mounted to a vertical surface, (not shown) is simple to use. As shown in FIG. 1, eyeglasses 34 have their right and left temples 36 and 38 respectively in their folded position. The user needs only one hand to secure the eyeglasses onto the nosepiece of eyeglasses 34 on nose-shaped bridge 16 of the eyeglass holder 10. Temples 36 and 38 simply slide behind nose-shaped bridge 16 and recline on top 28 of rectangular mount 20. Since the nose-shaped bridge 16 is sloped to the rear, the temples are thus constrained from slipping from the holder 10. Further, the temples of most eyeglasses are bowed when folded. The space between the back 18 of the nose-shaped piece, at the mount 20 and the vertical wall (not shown) is defined as the opening in the specification and in the claims. In the case that the eyeglass holder is of proper opening, the temples urge against the vertical surface which carries the eyeglass holder 10; thus providing additional support for eyeglasses 34. The term opening is defined here and in the claims as the distance between the back 18 of the nose-shaped piece at the mount 20 and the opposing vertical wall (not shown). The opening lies in a range between 10–15 mm. The preferred opening is 11 mm. Further, the back 30, of the rectangular mount 20, of the preferred embodiment is slightly resilient. Resilient here means that the material of the eyeglass holder is capable of withstanding shock without permanent disfiguration or that compressible. This definition of resilient applies both to the specification and to the claims. This advantage permits storage of all or nearly all varieties of eyeglasses while holding them more snugly. Additionally, the eyeglass holder acts as a shock absorber. The eyeglass holder, constructed of materials described herein, is able to withstand a maximum shock, ranging from 4 to 9 kilograms of force.

Since the bridge 16 of nose-shaped piece 14 is tapered, it will accommodate a wide variety and types of eyeglass nosepieces. When the eyeglasses are needed they are simply and easily removed by grasping them between the thumb and fingers and drawing the eyeglasses upward.

Albeit the foregoing describes the invention mounting the eyeglass holder to an automotive dashboard, this was solely for illustrative purposes. The eyeglass holder may be advantageously installed in kitchens, bathrooms, lockers, offices, boats, airplanes and the like. It can be attached to computers or wherever there is a need for readily available eyeglasses. The eyeglasses described herein form no part of the invention as described and claimed.

ADVANTAGES OF THE INVENTION

The invention provides for a one piece, inexpensive, easy to produce eyeglass holder. It allows quick, simple, convenient, safe and secure storage and removal for all types of eyeglasses. Construction materials, such as plastics, are readily available. The invention is easy to use requiring the use of only one hand. Mounting of the eyeglass holder is quick and easy. Removal, if desired, is also quick and easy. Further, the eyeglass holder is esthetically pleasing. Additionally, it acts a shock absorber against turbulent motion and accidental striking. As such, the eyeglass holder is able to withstand a maximum shock in the range of 4 to 9 kilograms force before its grip on the eyeglasses gives way.

We claim:

1. An eyeglass holder for supporting a single pair of eyeglasses, having a nose piece and temples, the eyeglass holder, which has the shape of a nose, having a front and a back, a bottom nostril portion, a top eyeglass supporting rearwardly sloped tapered bridge portion and a width, with the bottom nostril portion and the top eyeglass supporting bridge portion having a top and a back mounting vertically on a vertical surface, comprising:

I. an eyeglass temple-supporting horizontally positioned mount having a front, a back, a top, a width and sides which define a block with the front of the mount being attached to the back of the bottom nostril portion of the nose, and II. a fastener associated with the back of the mount for attaching it to the vertical surface, an opening between the top eyeglass supporting bridge portion of the nose and the back of the mount, which the opening lies between ten and fifteen mm and is adapted to urge the temples of the eyeglasses mounted thereon against the vertical surface upon which the eyeglass holder is mounted.

2. The eyeglass holder of claim 1, wherein the top of the bridge portion contains a saddle.

3. The eyeglass holder of claim 1, wherein the mount is rectangular.

4. The eyeglass holder of claim 3 where the rectangular mount has a width greater than the width of the nose.

5. The eyeglass holder of claim 1 wherein the nose and the mount are hollow.

6. The eyeglass holder of claim 1, wherein the fastener is an adhesive.

7. The eyeglass holder of claim 6 where the fastener is an adhesive tape attached to the back of the horizontally positioned mount.

8. The eyeglass holder in claim 1 wherein the back of the nose of the eyeglass holder is resilient.

9. The eyeglass holder of claim 1, wherein the deviation of the bridge portion from the back of the mount lies between five and twenty degrees.

10. The eyeglass holder of claim 1, wherein the opening is 11 mm.

11. The eyeglass holder of claim 1, wherein holder is contructed of resilient material, in which the eyeglass holder is able to withstand a maximum shock, ranging from four to nine kilograms of force.

12. The eyeglass holder of claim 1, where the deviation of the bridge portion from the back of the mount is seven degrees.

* * * * *